United States Patent
Okazaki et al.

(12) 
(10) Patent No.: US 6,424,606 B1
(45) Date of Patent: Jul. 23, 2002

(54) METHOD FOR DETECTING VIBRATION IN A DISC DRIVE AND APPARATUS THEREFOR

(75) Inventors: Shigeki Okazaki, Sayama (JP); Yam Fei Lian, Singapore (SG); Yew Teng Too, Singapore (SG); Bin Chye Lim, Singapore (SG)

(73) Assignee: Creative Technology LTD, Singapore (SG)

(*) Notice: Subject to any disclaimer, the term of this patent is extended or adjusted under 35 U.S.C. 154(b) by 0 days.

(21) Appl. No.: 09/668,516

(22) Filed: Sep. 22, 2000

(51) Int. Cl.⁷ .................................................. G11B 7/00
(52) U.S. Cl. ............................ 369/44.32; 369/53.12; 369/53.18
(58) Field of Search .................... 369/43, 44.11, 369/44.14, 44.27, 44.28, 44.29, 44.32, 44.35, 47.1, 53.1, 53.12, 53.13, 43.18

(56) References Cited

U.S. PATENT DOCUMENTS 6,028,826 A * 2/2000 Yamamoto et al. ...... 369/44.35

\* cited by examiner

Primary Examiner—Muhammad Edun
(74) Attorney, Agent, or Firm—Ladas & Parry

(57) ABSTRACT

In a CD drive 100, a tracking subsystem comprising tracking detector 330, a control processor 310 and tracking actuator assembly 340, is coupled to photodiodes A–F, to have the lens assembly 200 track a data track 140 on a disc 105. A vibration detector subsystem comprising a vibration detector 350, the control processor 310, and the speed setting function 315, is also coupled to photodiodes A–F, and the vibration detector subsystem disables the tracking subsystem and detects vibration of the lens assembly 200 at a resonant speed.

17 Claims, 6 Drawing Sheets

METHOD FOR DETECTING VIBRATION IN A DISC DRIVE AND APPARATUS THEREFOR

FIELD OF THE INVENTION

The present invention relates to detecting vibration of a disc in a disc drive and more particularly to determining an operating speed at which user perceptible effects caused by such vibration emanating from the drive is reduced to a relatively less perceptible level.

BACKGROUND OF THE INVENTION

Compacts discs or CDs, as they are often referred to, are used as a common form of economical storage media. Initially, CDs were used as a media for distributing music. Later CD-read-only-memory or CD-ROMs were used for distributing computer software. Today, with the advent of re-writable CD equipment into the consumer market and DVD (digital versatile disc) players, the CD has become a very popular media for storing audio, video and computer software.

With the growing popularity of CDs, the speed of rotation of CD drives has also increased from 1× to 52×, and perhaps even faster speeds may be achieved going forward. A problem that has arisen due to the increasing speed of rotation of the CDs in a disc drive is a perceptible audio noise. The noise, for the most part, is caused by vibrations within the disc drive, and poses a source of concern and irritation to a user. A primary cause of the noise is warped and/or unbalanced discs, which may be the result of variations in the disc manufacturing processes and/or materials. Of course, when such warped and/or unbalanced discs are used at lower rotating speeds, as in the past, no perceptible noise results. Hence, the noise is brought about by the higher speeds of rotation, which in turn is necessitated by requirements for faster data rates.

European patent EP946940B1, by Siemens Nixdorf of Germany, discloses a CD ROM drive where in response to detecting noise or vibration in the drive, the speed of rotation of the CD is reduced. However this patent does not show an efficient method nor means for detecting the vibration. A PCT patent application WO990299 by Matsushita of Japan discloses attaching an accelerometer to the CD drive to detect vibration. A disadvantage of this method is the high cost of accelerometers, and in addition, there are concerns with space within the drive for mounting the accelerometer, and also concerns as to the location within the drive at which the accelerometer should be mounted.

Another approach is provided in JP11185369A2, by Hitachi Ltd. of Japan, which relates to using counterweights in a turntable in the CD drive to alleviate or offset the effects of an unbalanced or warped disc. Again, using such a turntable adds to the cost of the drive. U.S. Pat. No. 5,893,048, assigned to Dell USA, discloses a method of determining vibration of the CD by detecting the speed at which a read/write head in the CD drive moves, as the read/write head moves along an axis perpendicular to the CD, to maintain focus on a data track on the CD i.e. a focusing signal is monitored to provide an indication of the vibration of the rotating CD. This patent teaches rotating a disc at a high speed, and when the detected speed of movement of the read/write head is higher than an allowable limit, the speed of rotation of the disc is reduced to a lower speed. This method requires that a disc is rotated at a higher speed first, and at such speeds the CD drive will tend to emit a significant degree of audible noise caused by vibration. Consequently, a user will have to tolerate such noise until the detection and subsequent speed change occurs. Further, this patent teaches storing an identifier and corresponding vibration level of very disc that is loaded in the CD drive, and having a database to store such information. This means that a disc is tested only once and should the disc become warped or unbalanced later, the drive will not be able to detect the change and a user will have to tolerate any resultant noise.

BRIEF SUMMARY OF THE INVENTION

The present invention therefore seeks to provide a method and apparatus for detecting vibration in a disc drive and an apparatus therefor, which overcomes, or at least alleviates, the above mentioned problems of the prior art.

In one aspect, the present invention provides a data storage drive for a removable data storage media having at least one data track thereon, wherein there is relative movement between the removable data storage media and a pickup head assembly, wherein the data storage drive has a tracking subsystem for maintaining alignment between the pickup head assembly and the at least one data track, the data storage drive comprising.

a vibration detect subsystem coupled to disable the tracking subsystem, and the vibration detect subsystem being coupled to receive at least one output signal from the pickup head assembly, wherein the at least one output signal is indicative of displacement of the pickup head assembly when the tracking subsystem is disabled.

In another aspect the present invention provides a data storage drive for a data storage media having at least one data track thereon, the data storage drive comprising:

a media mover having a speed control input for receiving a speed setting, and the media mover for removably mounting the data storage media thereto, for moving the data storage media in accordance with the speed setting;

a movable pickup head located proximal to the data storage media loaded on the media mover, the movable pickup head for reading and/or writing data to/from the at least one data track when the movable pickup head is substantially aligned with the at least one data track, the pickup head for detecting its relative position to the at least one data track and providing a tracking signal;

at least one actuator coupled the movable pickup, the at least one actuator having an input for receiving tracking information, and for locating the movable pickup head in accordance with the tracking information;

a vibration detector module coupled to the movable pickup head, and the vibration detector having an output for providing a pickup head displacement signal; and a controller coupled to the media mover, the movable pickup head, the at least one actuator, and the vibration detector, the controller for receiving the tracking signal and the pickup head displacement signal, and providing the speed setting and tracking information, and the controller for inactivating the at least one actuator and measuring the pickup head displacement signal.

In yet another aspect the present invention provides a data storage drive for a removable data storage media having at least one data track thereon, the data storage drive comprising:

at least one control subsystem coupled to a movable pickup head assembly, a first actuator, a second actuator, and a speed controller, the at least one control subsystem for detecting the at least one data track and for moving the pickup head assembly to maintain focus on the at least one data track, for moving the pickup head assembly to maintain tracking between the pickup head assembly and the at least one data track, for monitoring data transfer between the pickup head assembly and the at least one data track, and for adjusting relative speed of movement between the pickup head assembly and the movable storage media to maintain reliable data transfer between the pickup head assembly and the at least one data track; and at least another control subsystem coupled to the at least one control subsystem, the at least another control subsystem for disabling the tracking between the pickup head assembly and the at least one data track prior to detecting movement of the pick up head, for determining whether the movement of the pickup head is within at least one predetermined limit, and for changing relative speed of movement between the pickup head and the removable storage media to bring the movement of the pickup head within the at least one predetermined limit.

In still another aspect the present invention provides a method for detecting vibration in a read/write data storage drive for a removable data storage media, wherein the removable data storage media has at least one data track thereon, the method comprising the steps of:

a) initiating relative movement between a pickup head assembly, in the data storage drive, and the removable data storage media with tracking between the pickup head assembly and the at least one data track enabled;

b) setting the relative movement to resonant speed of the pickup head assembly;

c) when the relative movement is substantially at the resonant speed of the pickup head assembly, disabling the tracking;

d) measuring the displacement of the pickup head assembly with the tracking disabled to determine a vibration value; and e) comparing the vibration value with a vibration value limit and changing the relative movement from the resonant speed to another speed in accordance with the result of the comparison.

BRIEF DESCRIPTION OF THE DRAWINGS

An embodiment of the present invention will now be described, by way of example, of which.

DETAILED DESCRIPTION OF THE DRAWINGS

Figure 1:
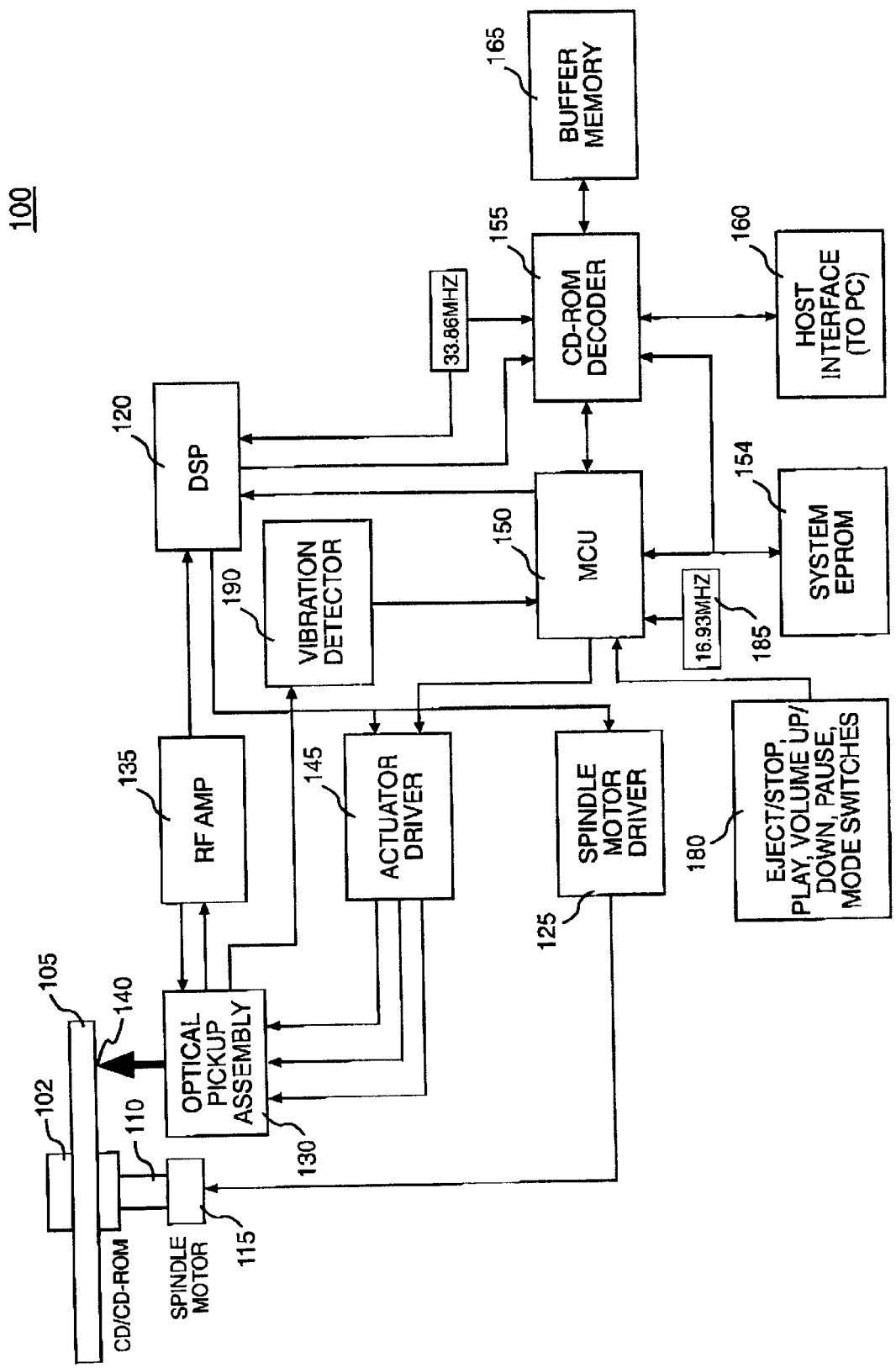
FIG. 1 shows a block diagram of a compact disc drive incorporating a vibration detector in accordance with the present invention.

FIG. 1 shows a compact disc drive 100 which includes a disc holder 102 on which a disc 105 is removably mounted. The disc holder 102 is connected to a spindle 110 which is driven by a spindle motor 115. The spindle motor 115 is a brushless motor which provides the drive to rotate the disc 105, which is rotated at a selected speed. As is known a control subsystem comprising a digital servo processor (DSP) 120, a spindle motor driver 125, the spindle motor 115, an optical pickup 130, and a radio frequency (RF) amplifier 135, ensure the disc 105 is rotated at the selected speed. However, another method of rotating the disc 105 at the selected speed utilizes the spindle motor driver 125 to monitor the speed of rotation, and in conjunction with the DSP 120, provide the necessary output to the spindle motor 115 to rotate the disc 105 at the selected speed. A further description will be provided later.

The spindle motor driver 125 converts a spindle motor control signal from the DSP 120 to a three-phase signal for the spindle motor 115, thereby providing the required electrical current to the spindle motor to rotate the disc 105 at the selected speed.

Figure 2:
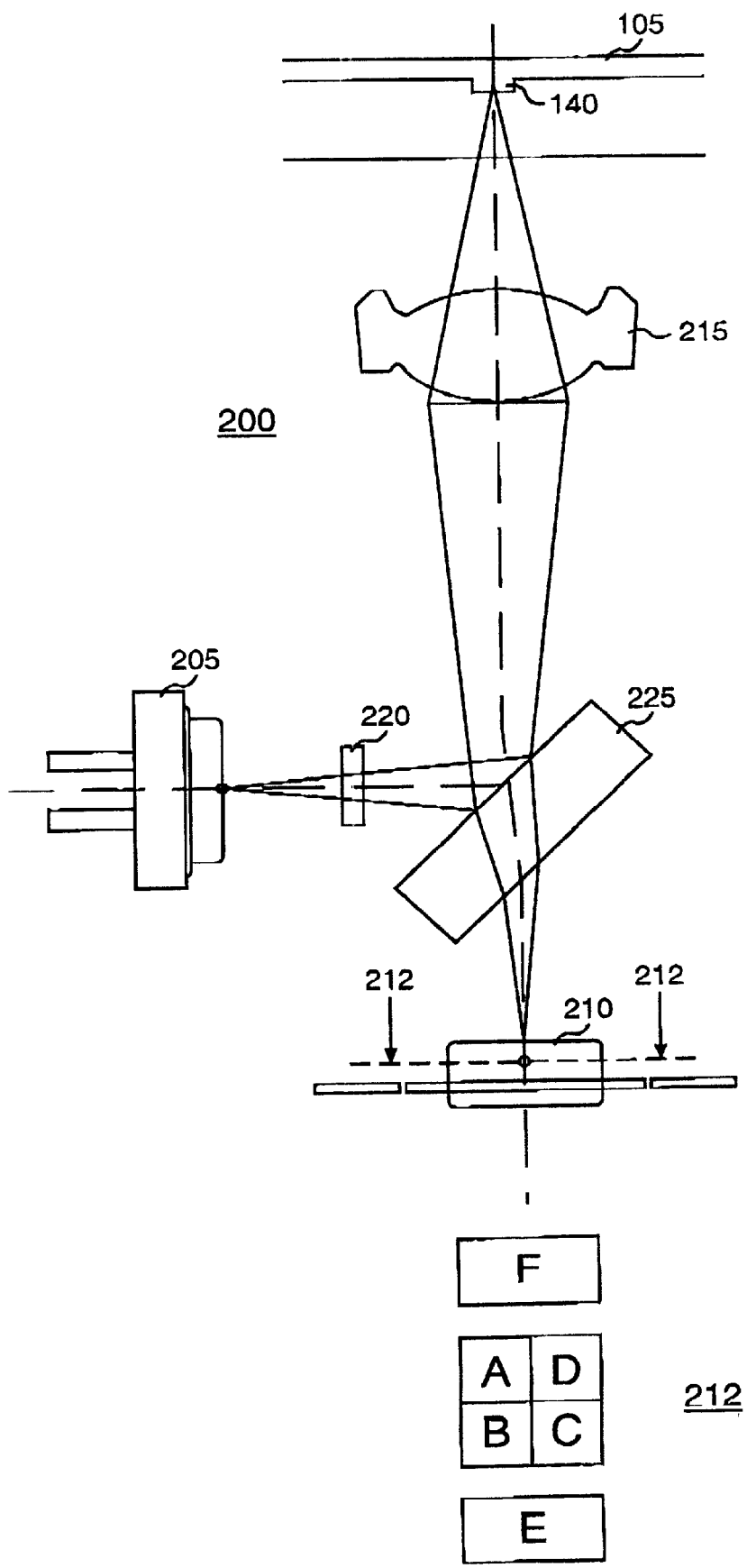
FIG. 2 shows a diagram of the optical pickup assembly in FIG. 1.

The optical pickup assembly 130 comprises a lens assembly and a sledge motor (not shown). The lens assembly will now be described with additional reference to FIG. 2. The lens assembly 200 houses a laser diode 205, an array of photodiodes 210, an objective lens 215, and a focus actuator and radial actuator, both of which are not shown. The focus and radial actuators provide tracking of a beam from the laser 205 on a data track 140 on the disc 105. A top view along plane 212 of the array of photodiodes 210 is provided for illustrative purposes to show relative positions of the photodiodes A–F. The lens assembly 200 includes a diffraction grating 220, and a polarizing beam splitter 225. The sledge motor mentioned earlier is used to position the lens assembly 200 at the approximate position on the disc 105 when a number of tracks are jumped. The DSP 120, actuator driver 145, the optical pickup 130, and the RF amplifier 135 form a variety of control subsystems that control focussing, tracking and the sledge motor operation in the optical pickup 130. A description of the various control subsystems will be provided later.

The laser diode 205 produces a laser beam that is reflected from the surface of the disc 105 through the objective lens 215 and a polarizing beam splitter 225 onto the array 210 of photodiodes A–F, which are arranged in a predetermined formation as can be seen in a top view 212. The photodiodes A–F produce output signals in response to contours on the disc 105. When the photodiodes A–F are focused and aligned, or track, the data track 140 on the disc 105, the output signals from the photodiodes A–D represent information stored on the disc 105. In addition, the signals from the photodiodes A–F are used to determine a variety of parameters that are used as feedback in a variety of control subsystems that track and focus the optical pickup 130 on the data track 140.

The optical pickup assembly 130 is produced by various manufacturers including Hitachi, Sanyo, Sankyo, and Sony. Typically specifications of the optical pickup assembly 130 provide the weight of the optical pickup 130, and the resonant frequencies of the focusing and the tracking actuators. Actuators are coils that are attached to the objective lens 215 allowing the objective lens 215 to moved to focus the laser beam onto the surface of the disc 105, and allowing the objective lens 215 to track the data track 140, by applying electrical signals to the actuator coils. It will be appreciated by one skilled in the art, that at the resonant frequency of the actuators, the vibration of the lens assembly 200 is at a maximum, and that at the maximum vibration it is useful to measure the system vibration that can be caused by an unbalanced disc. Hence, the present invention advantageously determines maximum degree of vibration of the lens assembly 200 by setting the actuators in the optical pickup assembly 130 to operate at resonant frequency.

Returning now to FIG. 1, the RF amplifier 135 is a pre-amplifier for output signals from the optical pickup assembly 130 and provides the amplified output to the DSP 120. The RF amplifier 135 conditions the signal from the photodiodes A–F, and ensures a high signal-to-noise ratio of the signal sent to the DSP 120. In addition, the RF amplifier 135 incorporates automatic laser power control, and amplification of focus error and tracking error signals. In relation to the laser power, it is essential to maintain the light output level of the laser diode at a consistent level, which is achieved by monitoring a portion of the laser output via a monitor photo diode (not shown). The detected level is fed back through an automatic power control circuit within the RF amplifier 135, thereby stabilizing the light intensity of the laser diode.

The actuator driver 145 provides second stage amplification of focusing and tracking signals from the DSP 120, to drive the various actuators, including the focusing and tracking actuators, in the optical pickup assembly 130.

The DSP 120 performs a variety of functions including, signal demodulation, error correction, interpolation, and digital equalization. The primary function of the DSP 120 is eight-to-fourteen modulation (EFM) signal demodulation, and first and second layers of error correction of the input signal received from the RF amplifier 135 and servo control. The DSP 120 provides an output comprising a serial bit stream of data, and also has a built-in 1-bit digital to analogue converter (DAC) which provides an audio output signal.

In addition, the DSP 120 also controls the optical pickup assembly 130 through the actuator driver 145, and the DSP 120 receives feedback from the photo diodes A–F in the lens assembly 200. A built-in digital phase lock loop (PLL) in the DSP 120 supports the spindle motor control signal for the spindle motor driver 125, as was alluded to earlier when discussing the speed control of the spindle motor. The spindle motor control signal controls the speed of rotation of the spindle motor to achieve Constant Linear Velocity (CLV) and Constant Angular Velocity (CAV). The DSP 120 communicates with the microcontroller 150 through a 4-bit data bus and two handshaking lines.

A CD-ROM decoder 155 extracts and buffers CD-ROM data from the DSP 120 and sends it to a host computer via host computer interface 160. The CD-ROM decoder 155 also performs a third layer of error correction (EDC/ECC) to ensure data integrity. Data is buffered in a buffer memory 165.

The buffer memory 165 is a 128 kilobyte DRAM which buffers data sent to the CD-ROM decoder 155. The third layer error correction is performed on the data by the CD-ROM decoder 155 prior to transferring the data to a host computer (not shown) via host computer interface 160.

The microcontroller 150 controls the various functions in the drive 100, including user inputs from controls on a front panel 180 and communications with a host computer via host interface 160. For example, the microcontroller 150 checks various functions for correct operation and ensures that during start-up of the drive, the various functions are performed; in the correct sequence. The microcontroller 150 also controls the CD-ROM decoder 155, the DSP 120, LED (Light Emitting Diode) indicators (not shown) and a tray motor 152 (not shown). Connected to the microcontroller 150, is a system EPROM 154 which stores the necessary software programs for the microcontroller 150 to operate, and a crystal 185 to provide a system clock, as is known in the art.

To read data from the disc 105, the sum of the output signals from the photodiodes A, B, C and D (in FIG. 2) are fed to the RF amplifier 135 and passes through a differential amplifier to generate a RF signal (RFGO). This signal is provided to the DSP 120 to perform EFM signal demodulation, and the first and second layer of the error correction. Resulting serial data is provided to the CD-ROM decoder 155. The CD-ROM decoder 155 extracts the data for transmission to a host from the serial data, performs third layer error detection and correction code (EDC) and error correction code (ECC), and sends the corrected data to the host computer through the host interface 160.

The drive 100 advantageously includes a vibration detector circuit 190 for detecting the vibration of the optical pickup assembly 130. The vibration detector 190 has inputs coupled to receive input signals from the photodiodes A–F in the lens assembly 200, processes the input signals, and provides an output signal indicating the degree of vibration of the optical pickup assembly 130 to the microcontroller 150. The microcontroller 150 can then determine whether the detected degree of vibration is within predefined allowable limits and take appropriate action, as will be described later.

Figure 3:
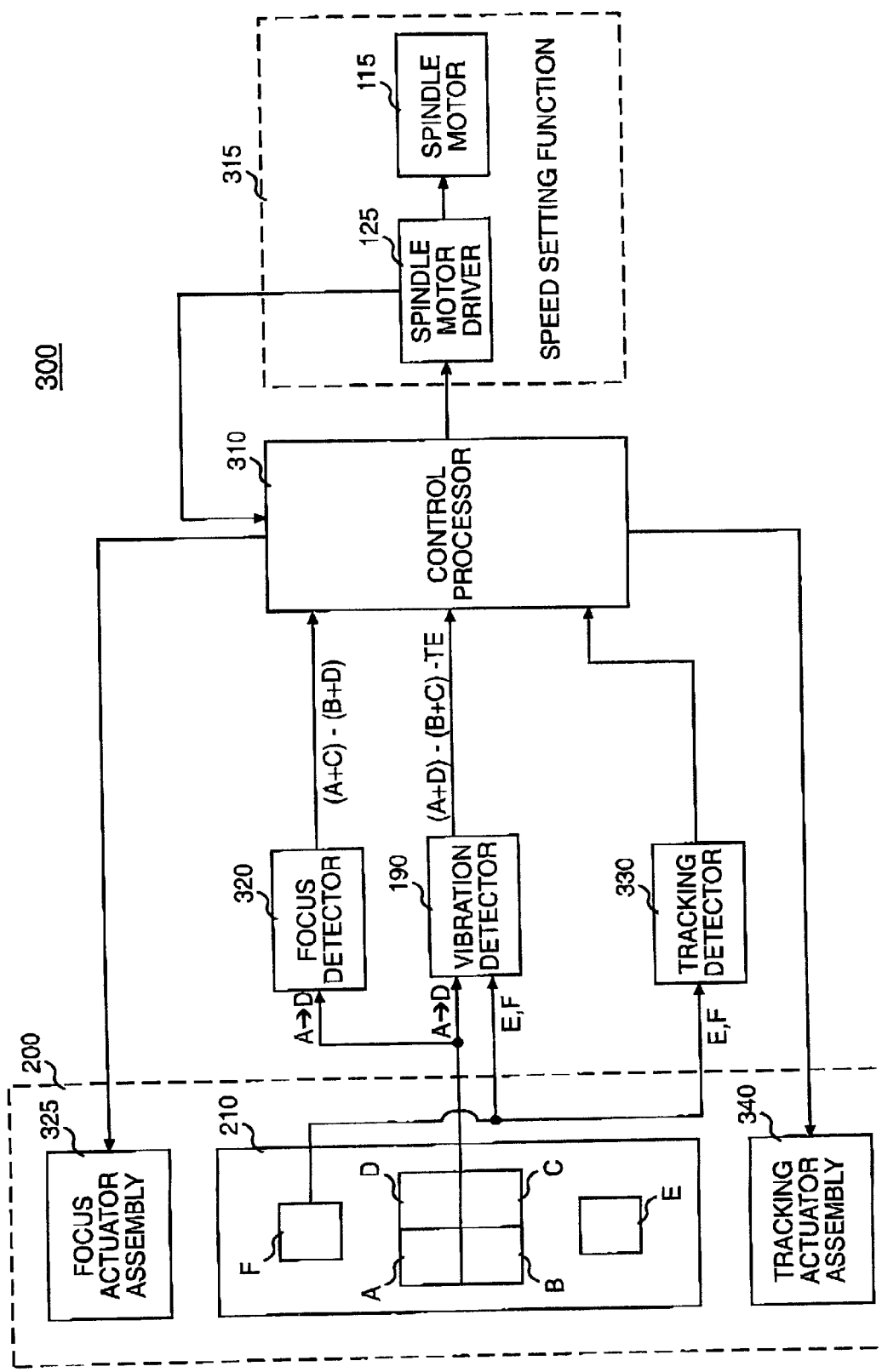
FIG. 3 shows a functional block diagram of control subsystems in FIG. 1.

With reference to FIG. 3, the operation of the drive 100 can be more easily understood when considering the drive 100 in terms of four control subsystems. These include a spindle motor servo control subsystem or speed control subsystem, a focus control subsystem, a radial tracking control subsystem or simply tracking control subsystem, and a vibration control subsystem. Collectively, the speed control, focus and tracking control subsystems maintain the laser beam from the laser diode 205 on the exact location on the data track 140 on the disc 105, while the vibration detection control subsystem, in accordance with the present invention, advantageously, controls the degree of vibration of the optical pickup 130 by detecting the degree of vibration, and changing the speed of rotation of the spindle motor 115 to reduce the vibration.

The first control subsystem is the speed control subsystem which controls the speed of rotation of the disc 105. In operation, the spindle motor driver 125 senses the speed of the spindle motor 11, and provides an output indicating the speed of rotation to the control processor 310. The control processor 310 then determines whether the speed of rotation is at a predefined speed. If the speed is at the predefine speed of rotation, no change of speed is required, however, when the speed is not at the predefined speed, then the control processor 310 provides an output to a speed setting function 315 to change the speed to become the predefined speed. The function of the control processor 310 is performed by the microcontroller 150 and the DSP 120, and the speed setting function 315 is performed by the spindle motor driver 125 and the spindle motor 115.

In the drive 100, the speed control subsystem is made up of the microcontroller 150, the DSP 120, the spindle motor driver and the spindle motor 115. The drive 100 is a Constant Angular Velocity (CAV) device. Therefore, the spindle motor 115 must rotate the disc 105 at a constant rotational speed when the disc 105 is read by the optical pickup assembly 130. The speed of rotation of the disc 105 is controlled by the microcontroller 150.

A portion of the DSP 120 operates in pulse width modulation mode to control the spindle motor 115 through the spindle motor driver 125. An output signal from the DSP 120 to the spindle motor driver 125 is represented in 3 levels i.e. VSS, VREF, and 2VREF. When the output pulses have an amplitude of 2VREF the spindle motor 115 accelerates, output pulses with an amplitude of VSS cause the spindle motor 115 to decelerate, and when the output pulses have an amplitude of VREF, the spindle motor 115 is not actuated. Hence, the duty cycle of a pulse width modulated signal determines a speed setting of the spindle motor 115. The spindle motor driver 125 comprises a H-Bridge driver for the spindle motor 115 and amnplifies the output signal from the DSP 120. A H-Bridge is necessary in order to drive the spindle motor 115 in both directions, of course the opposite direction is for braking.

During the sequence of enabling the drive 100 to play the disc 105, the spindle motor 115 "kick starts", usually after laser alignment is completed and focus stages have operated correctly. This is accomplished by the microcontroller 150 providing a control data signal to the speed control subsystem which causes the spindle motor 115 to start running up in speed.

The second control subsystem is the focus control subsystem which controls the focusing of the laser beam on the data track 140 on the rotating disc 105. In operation, a focus detector 320 detects the focus of the laser beam on the data track 140 from output signals from the photodiodes A–D, and provides an output signal indicating the degree of focus to the control processor 310. The control processor 310 receives the output signal and determines whether the degree of focus is within predefined limits. If it is, then no change in focus is required. However, when the degree of focus is not within the predefined limits, then the control processor 310 provides an output to the focus actuator assembly 325 which moves the objective lens 215 in a direction that will cause the laser beam to focus on the data track 140, and the resulting output signal from the photodiodes A–D to come within the predefined limits. The function of the focus detector 320 is performed by the RF amplifier 135 and the DSP 120, while the function of the control processor 310 is as defined earlier. The function of the focus actuator assembly 325 is performed by the focus actuator in the lens assembly 200, and the actuator driver 145.

In the drive 100, the focus control subsystem is made up of the DSP 120, the focus actuator in the lens assembly 200, the actuator driver 145, the RF amplifier 135 and the microcontroller 150. In order to obtain reliable output signals from the photodiodes A–D, it is necessary that the laser beam be properly focused on the data track 140 on the disc 105. The tolerance of the dimensions of the disc 105, and the combination of spindle 110 and disc holder 102 tolerances, can cause variations in the spacing between the disc 105 and the objective lens 215. Such variation, consequently, leads to incorrect focusing of the laser beam on the data track 140. To maintain a constant spacing between the disc 105 and the objective lens 215, the objective lens 215 is made movable in a vertical direction relative to the surface of the disc 105, i.e. towards and away from the disc 105 by the focus actuator assembly 325 in the lens assembly 200.

In operation a focus error is determined from the output signals of the photo diodes A–D which are provided to the RF amplifier 135, and then on to a differential amplifier to produce a focus error output (FEO) signal. The value and polarity of the FEO signal indicates the degree and direction, respectively, of the focus error. The FEO signal is provided to the DSP 120 which processes the signal and generates a focus output (FOO) signal for the actuator driver 145. The actuator driver 145 is a H-bridge driver and provides the necessary differential current drive signal to F+ and F− inputs of the focus actuator in the lens assembly 200 to move the objective lens 215 accordingly When focus is within the predefined limits, the FEO signal will be zero. However, when the focus is not within the predefined limits, then depending upon the direction and degree in which the out-of-focus situation arises, the polarity of the FEO signal will be either negative or positive with respect to zero, and the magnitude of the FEO signal is indicative of the degree to which the laser beam is out of focus. A resultant FOO signal activates the focus actuator assembly 325 to move the lens assembly 200 to correct the focus of the laser beam on the data track 140.

The third control subsystem is the radial tracking control subsystem which controls the radial tracking of the laser beam on the data track 140 on the rotating disc 105. The radial tracking control subsystem includes a tracking detector 330 which detects the alignment of the laser beam with the data track 140 from output signals of the photodiodes E–F; and provides a tracking signal indicating whether the laser beam is tracking the data track 140, to the control processor 310. The control processor 310 receives the tracking signal and determines whether the tracking signal is within predefined tracking limits. If it is, then no change in tracking position of the optical pickup 130 is required. However, when the tracking signal is not within the predefined tracking limits, the control processor 310 provides an output to a tracking actuator assembly 340, which moves the lens assembly 200 such that the tracking signal changes to come within the predefined tracking limits. The function of the tracking detector 330 is performed by the RF amplifier 135 and the DSP 120, while the function of the control processor 310 is as defined earlier. The function of the tracking actuator assembly 340 is performed by the tracking actuator in the lens assembly 200, and the actuator driver 145.

In the drive 100, the lens assembly 200 must follow the data track 140 precisely, as it spirals from the center of the disc 105 towards the outer edge of the disc 105 in order to ensure a reliable data signal. As there is no mechanical contact between the optical pickup 130 and the disc 105, tracking is accomplished by the radial tracking control subsystem. A tracking or radial error signal is derived from the output signals from the E and F photodiodes in the lens assembly 200. These two signals are fed into the RF amplifier 135, and passed to a differential amplifier to provide a tracking error output (TEO) signal. The DSP 120 processes the TEO signal and generates a tracking output (TRO) signal suitable for the actuator driver 145. The actuator driver 145 is a H-bridge driver which provides a differential current drive signal to inputs T+ and T− of the tracking actuator in the lens assembly 200.

As the disc 105 rotates and tracking error develops, the resulting level of the output signals from the E and F photodiodes will vary according to the direction and amount of deviation of the reflected laser beam away from the center of the data track 140, which will result in a radial tracking error. Consequently, the resultant TEO signal will vary in level and polarity, depending upon the magnitude and direction of the radial tracking error. The resultant TRO signal activates the tracking actuator assembly 340 to move the lens assembly 200 to correct the tracking of the laser beam on the data track 140.

In accordance with the present invention, the fourth control subsystem is the vibration detection control subsystem which controls the degree of vibration of the lens assembly 200 caused by the rotation of unbalanced or warped discs in the drive 100. The vibration detection control subsystem comprises a vibration detector 190 which detects the vibration of the lens assembly 200 from output signals of the photodiodes A–F in the lens assembly 200, and provides a vibration detect signal to the control processor 310. The control processor 310 receives the vibration detect signal and provides a speed setting signal to the speed setting function 315, which sets the speed of rotation of the spindle 110, and thus the rotational speed of the disc 105 can be set to a speed based on the vibration detected by the vibration detector 190. The function of the vibration detector 190 is performed by a circuit shown in FIG. 5, while the function of the control processor 310 is as defined earlier. The speed setting function is performed by the spindle motor 115 and the spindle motor driver 125, as was described earlier.

In the drive 100, signals from the photodiodes A–F are combined by the vibration detector 190 to determine the position of the lens assembly 200. Vibration of the optical pickup 130 due to the rotation of the unbalanced or warped disc 105 causes large displacements on the position of the lens assembly 200. This displacement can be measured by measuring the amplitude swing from the combined signal from the output of the photodiodes A–F.

Figure 4:
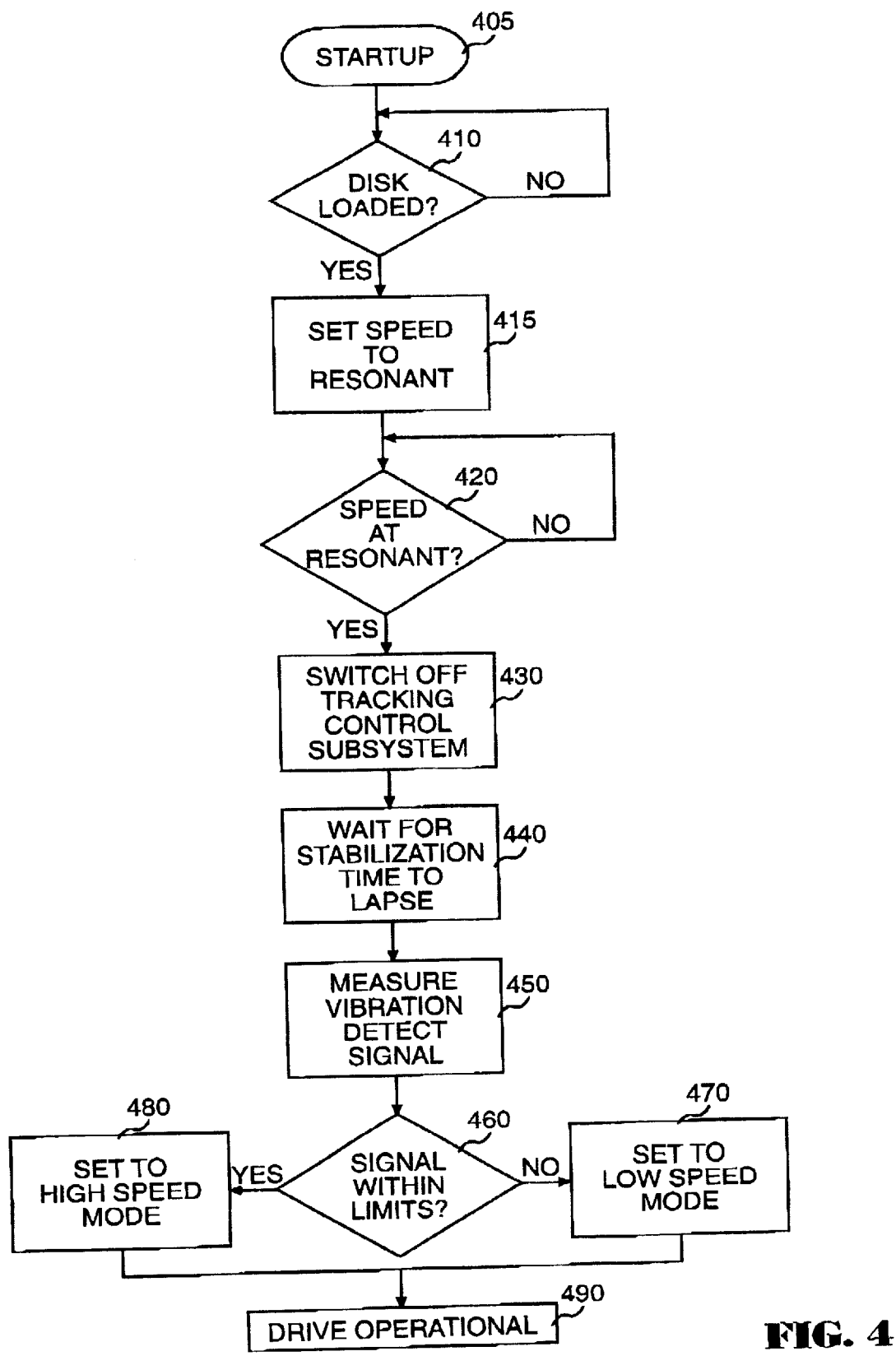
FIG. 4 shows a flow chart detailing the operation of a vibration control subsystem in FIG. 3.

Now with reference to FIG. 4, the operation of the vibration detection control subsystem follows. The process starts 405 with the microcontroller 150 determining whether the disc 105, has been loaded 410 in the drive 100. This may be accomplished by monitoring the position of a disc tray, which is typically controlled by the microcontroller 150. When the microcontroller 150 detects that the disc 105 is loaded 410, the microcontroller 150 uses the speed control subsystem to set 415 the speed of rotation of the disc 105 to the resonant frequency of the tracking actuator in the lens assembly 200.

Resonant frequency of the tracking actuator in the lens assembly 200 refers to the frequency of an excitation signal applied to the tracking actuator that will cause it to oscillate or move uncontrollably. The resonant frequency of the tracking actuator may be obtained by applying an excitation signal of varying frequencies from low to high frequency to the actuator, where the range of frequencies will depend on operating conditions, and measuring the physical movement of the actuator. The first resonant frequency, which is also known as the fundamental frequency, corresponds to the lowest frequency that will cause the lens assembly 200 to oscillate. The frequency at which the maximum amount of displacement occurs is noted, and it is this frequency that is used as the resonant frequency of the tracking actuator in the lens assembly 200. Hence, in this way, the resonant frequency for a particular lens assembly can be predetermined.

As described earlier, the duty cycle of a pulse width modulated signal determines the speed of rotation of the spindle motor 115. For example, when the resonant frequency of the actuator in the optical pickup in a particular drive is 50 hertz, the speed control subsystem will be set to 50 hertz. The resonant frequency of the actuators in an optical pickup assembly is provided by the manufacturers of such products, and is often included in the specifications of the product.

The microcontroller 150 monitors the speed of rotation of the disc 105 with the speed control subsystem 420 until the speed approaches the resonant speed setting. When the speed of rotation determined from the speed control subsystem 420 is within a predetermined tolerance of the resonant speed setting, the microcontroller inactivates 430 the tracking subsystem. A predetermined stabilization time is then allowed to elapse 440, and the vibration detect signal is measured 450 to provide a vibration value. The vibration on the optical pickup assembly 130 would be strongest since an external interference is created in the form of a rotating disc 105 at the resonant frequency of the actuator.

Measurement of the vibration signal can take the form of sampling and averaging of the signals from the photodiodes A–F, and other measurement methods as are known in the art for measuring such signals. The vibration value provides an indication of the radial displacement of the optical pickup 130, with the tracking subsystem inactivated, and which therefore represents vibration caused by the disc 105, more particularly by the unbalanced property of the disc 105.

The vibration value is then compared 460 with a predetermined vibration value limit. When the vibration value measured at resonance is greater than the predetermined vibration value limit, then the speed of operation is set 470 to low-speed mode, and the drive 100 is then operational 490 at the low speed. However, when the vibration value measured at resonance is less than the predetermined vibration value limit, then the speed of rotation is set 480 to high-speed mode, and the drive 100 is set to high speed. Low-speed refers to the speed of rotation of an unbalanced disc that will not cause annoyance to the user in the form of noise and vibration. High-speed refers to the maximum rated speed of the drive.

The process of determining the predetermined vibration value limit is as follows. Discs with varying degree of unbalance are acquired and graded. Each of the discs have their vibration value measured and recorded while being rotated at the resonant frequency of the tracking actuator. This is repeated many times and on different drives to obtain an average value. Thus, the amount of unbalance in the disc corresponds to the vibration value. The same sets of discs are then forced to rotate at the maximum rated speed of the drive and its acoustic noise and vibration measured. The maximum amount of unbalance in a disc that is allowed to rotate at the maximum rated speed of the drive is determined by the amount of noise and vibration that is acceptable by the user. The vibration value of that unbalance disc is the predetermined vibration value limit in 460.

Figure 5:
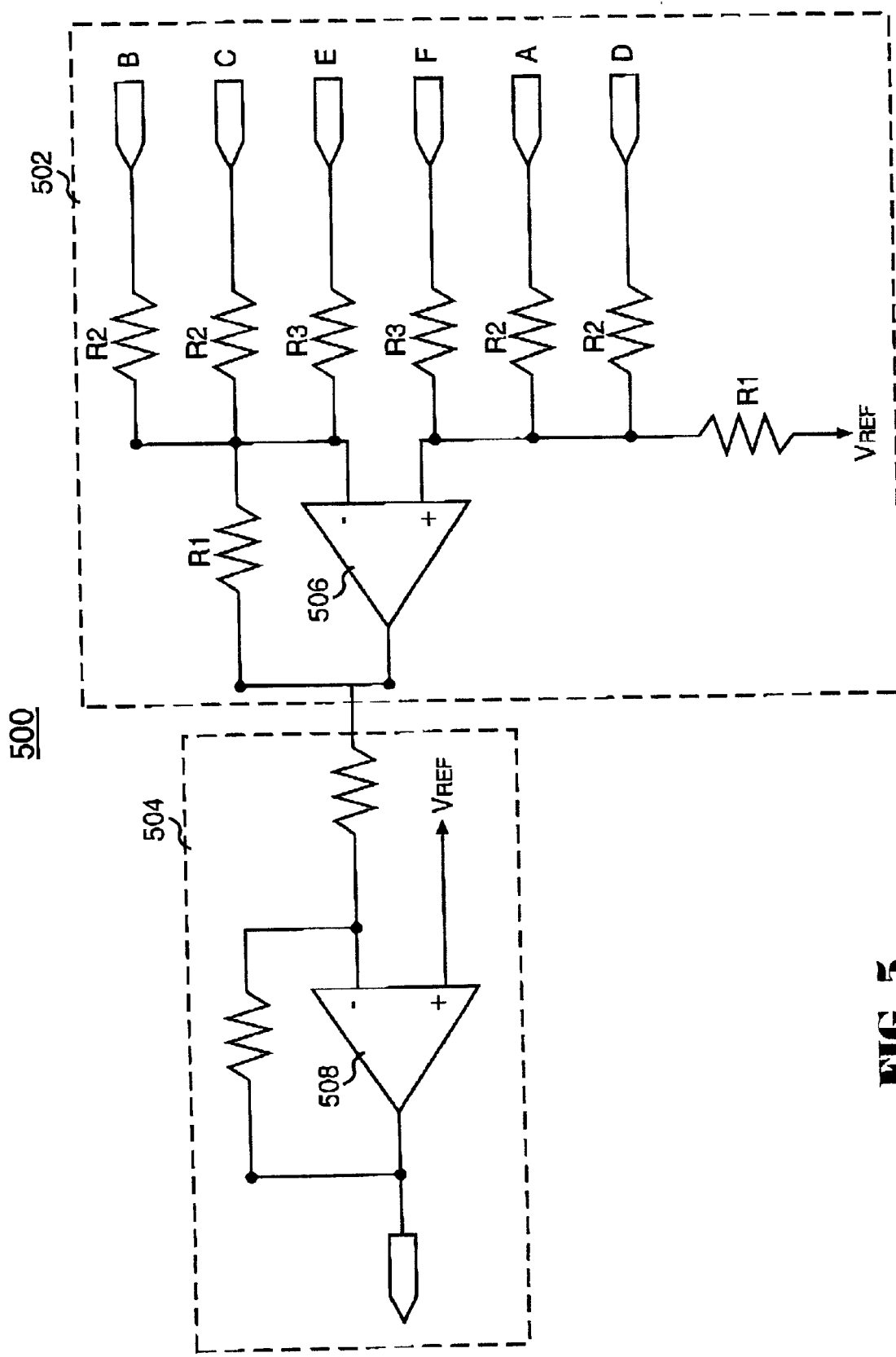
FIG. 5 shows a circuit diagram of the vibration detector in FIG. 1.

With reference to FIG. 5, a circuit 500 for the vibration detector 190 comprises a summing and subtracting portion 502 and an amplifier portion 504. The output of the photodiodes A–F provide the corresponding labeled inputs A–F of the summing and subtracting portion 502, which includes an opamp 506 that combines the signals in accordance with the following equation to provide an output signal.

OPAMP (506) OUTPUT=$G_1(A+D)-(B+C)-TE$ where $TE=(E-F)G_2$ $$G_1 = \frac{R_1}{R_2};$$

$$G_2 = \frac{R_1}{R_3}$$

The component TE is a tracking error caused by an eccentric disc, and subtracting this component yields a more accurate detection of the displacement of the lens assembly 200 due to vibration caused by rotation of an unbalanced or warped disc.

When the tracking system is switched OFF, the laser beam may land on the track 140 or in-between, also known as lands. The amount of laser light detected by photodiodes A to D will then vary due to variations in the amount of reflected laser light. More light will be received when the laser beam is on lands. Therefore, (A+D)−(B+C) will not only indicate the position of the objective lens 215, but will also include a portion of the tracking signal. A cleaner signal that represents the vibration of the objective lens 215 is be obtained when the tracking signal from photo diodes E & F used to compensate, for the change in the amount of light on the photo diodes A to D.

Thus, the tracking error signal TE is advantageously subtracted from (A+D)-(B+C) in accordance with the present invention in order to provide a more accurate detection of the displacement of the lens assembly 200 due to vibration caused by rotation of an unbalanced or warped disc.

The amplifier portion 504 includes an opamp 508 that receives the output signal from the opamp 506 and amplifies the signal to a level which is suitable for inputting to an analog to digital converter (ADC) (not shown). VREF is a reference voltage for biasing the amplifier to within its operating voltage range. The microcontroller 150 includes an ADC which is coupled to receive the output signal of the opamp 508, which is the vibration detect signal mentioned earlier.

Figure 6A:
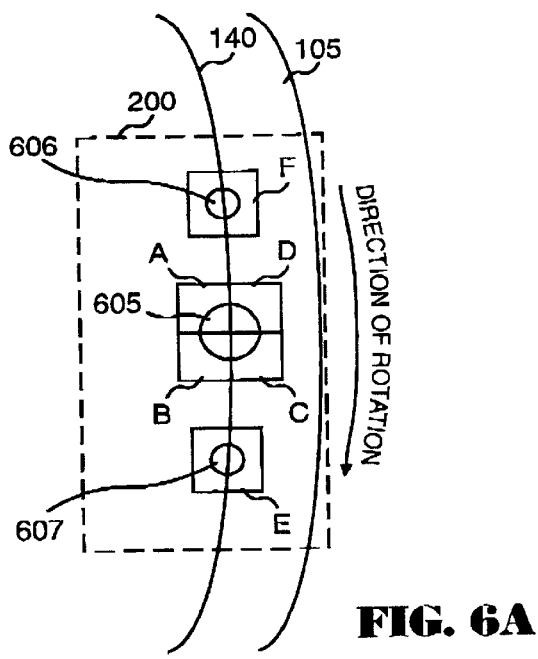
FIGS. 6A–6C show positions of the lens assembly in FIG. 3.

Now with reference to FIGS. 6A–6C and FIG. 7 the relationship between displacement of the lens assembly 200 and the vibration detect signal will be described. In FIG. 6A the lens assembly 200 is shown when there is no displacement. A circle 605 indicates a laser spot produced by the reflection of the laser beam from the data track 140. Similarly, laser spots 606 and 607 are produced on photodiodes F and E respectively, as is known in the art. The greater the area of each of the photodiodes A–D that receives the reflected laser beam, the greater the amplitude of the output signal produced by that photodiode. The same applies to photodiodes E and F.

Figure 7:
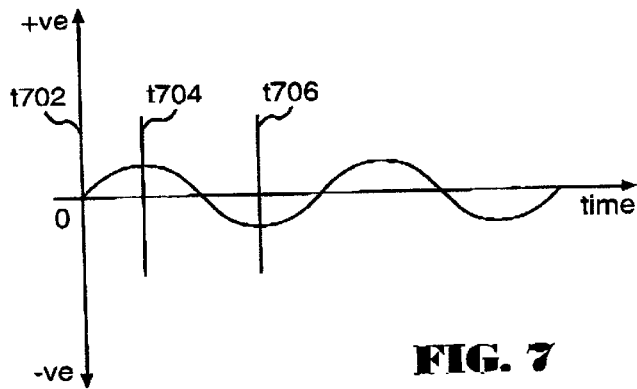
FIG. 7 shows a graph of the vibration detect signal produced by the circuit in FIG. 5.

When the tracking subsystem is activated, the relative position of the lens assembly 200 to the data track 140 is maintained in this position. FIG. 7 shows a graph of the amplitude of the vibration detect signal over time. When the lens assembly 200 is in the relative position shown in FIG. 6A, there is no displacement of the lens assembly 200, consequently the four photodiodes A–D receive about equal reflection of the laser beam from the data track 140 and their output signals have the same amplitude. Applying the equation above, the amplitude of the vibration detect signal obtained is zero.

i.e. (A+D)−(B+C)=0

In FIG. 7, the amplitude of the vibration detect signal when the lens assembly 200 is in the position in FIG. 6A is indicated at time t (702). When the lens assembly 200, and consequently the objective lens 215, is tilted towards the outer area of the disc 105, the laser spots will be in the positions shown in FIG. 6B. The four photodiodes A–D now receive unequal reflection of the laser beam from the data track 140, as shown by the circle 610, and their output signals will not have the same amplitude. Applying the equation above, the amplitude of the vibration detect signal obtained has a positive value i.e. (A+D)>(B+C)

Therefore, (A+D)−(B+C)=positive value

Figure 6B:
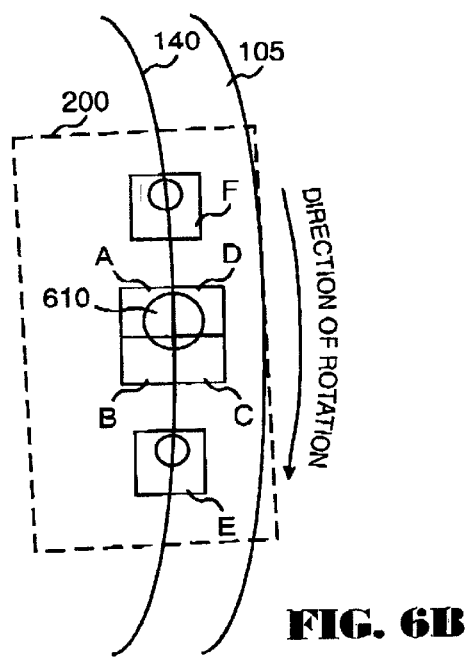

In FIG. 7, the amplitude of the vibration detect signal when the lens assembly is in the position in FIG. 6B is indicated as time t(704). When the lens assembly 200, and consequently the objective lens 215, is tilted towards the inner area of the disc 105, the laser spots will now be in the positions shown in FIG. 6C, consequently the four photodiodes A–D receive unequal reflection of the laser beam from the data track 140, as shown by the circle 615, and their output signals will not have the same amplitude. Applying the equation above, the amplitude of the vibration detect signal obtained now has a negative value.

i.e. (B+C)>(A+D)

Therefore, (A+D)−(B+C)=negative value

Figure 6C:
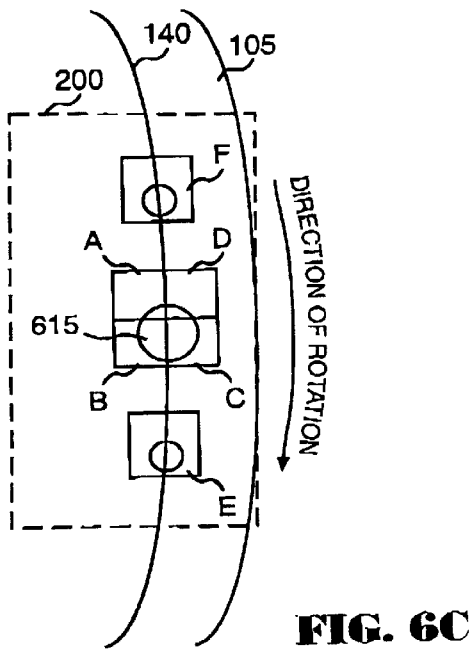

In FIG. 7, the amplitude of the vibration detect signal when the lens assembly is in the position in FIG. 6C is indicated at time t (706). For simplicity, the above illustrations assume the laser is directly on the data track 140, and that TE=0 (i.e. E−F=0). As mentioned earlier, when the laser is directly on the data track 140, the amount of light received by a photodiode is lower than when the laser is on a land, i.e. the region between data tracks.

When the tracking system is turned OFF, the laser beam may fall anywhere between data tracks, When the laser is exactly on a land, the amount of light received on a photodiode is higher then when the laser is directly on the data track 140. Consequently, the TE (E−F) signal will also be higher since the laser is on a land.

To avoid this change in the amount of light on the photodiodes A–F from affecting the accuracy of the vibration detect signal (A+D)−(B+C), in accordance with the present invention, TE advantageously subtracted from (A+D)−(B+C) resulting in the following equation for the vibration detect signal.

$$(A+D)-(B+C)-TE$$

As will be appreciated by those skilled in the art, the vibration value can be derived from the amplitude of the vibration detect signal in a variety of ways. In the drive 100, 60 samples of the analog vibration detect signal are taken and converted to digital values at a sampling rate of 0.5 milliseconds. The difference between the maximum and minimum of the digital values is then taken as the vibration value. Several cycles of spinning the disc 105 to resonant speed, sampling and averaging may be performed.

The present invention, as described, provides a vibration detector that does not require that a disc be spun at high speed, and one that determines a vibration value whenever a disc is loaded.

This is accomplished by determining the vibration value of a disc at the resonant frequency of the actuator of the optical pickup, and since the resonant frequency is lower than the operational frequency of a CD drive, the level of user perceptible noise produced by the drive would not be as appreciable as when the disc is spun at high speed. Further, the determination of a vibration value is done each time a disc is loaded into the CD drive.

The present invention therefore provides a method for detecting vibration of discs and an apparatus therefor which overcomes, or at least alleviates, the above mentioned problems of the prior art it will be appreciated that although only one particular embodiment of the invention has been described in detail, various modifications and improvements can be made by a person skilled in the art without departing from the scope of the present invention.

We claim:

1. A data storage drive for a removable data storage media having at least one data track thereon, there being relative movement between the removable data storage media and a pickup head assembly, the data storage drive having a tracking subsystem for maintaining alignment between the pickup head assembly and the at least one data track, the data storage drive comprising:
- (a) a vibration detect subsystem coupled to disable the tracking subsystem, and the vibration detect subsystem being coupled to receive at least one output signal from the pickup head assembly, the at least one output signal being indicative of displacement of the pickup head assembly when the tracking subsystem is disabled;
- (b) the vibration detect subsystem including:
  - (i) a vibration detector having an input coupled to the pickup head assembly, the vibration detector having an output coupled to provide a vibration detect signal, and
  - (ii) a control processor having an input coupled to receive the vibration detect signal and having an output for providing a speed setting;
- (c) a speed control subsystem coupled to receive the speed setting from the vibration detector subsystem, the speed control subsystem being for maintaining speed of relative movement between the removable data storage media and the pickup head assembly substantially at the speed setting; and wherein
- (d) the speed setting sets a resonant speed such that when the speed control subsystem is set to the resonant speed the pickup head assembly vibrates at its resonant frequency.

2. A data storage drive in accordance with claim 1, wherein the vibration detector comprises at least one amplifier.

3. A data storage drive in accordance with claim 1, wherein the vibration detector comprises at least one digital servo processor.

4. A data storage drive in accordance with claim 1, wherein the control processor comprises at least one microcontroller.

5. A data storage drive in accordance with claim 1, wherein the control processor comprises at least one digital servo processor.

6. A data storage drive in accordance with claim 1, wherein the pick up head comprises at least one actuator, and wherein the resonant frequency of the at least actuator is the resonant frequency of the pickup head assembly.

7. A data storage drive in accordance with claim 1, wherein the pickup head assembly comprises an optical pickup head assembly coupled to provide the at least one output signal to the vibration detect subsystem.

8. A data storage drive in accordance with claim 7, further comprising a focus control subsystem for maintaining a predetermined distance between the optical pickup head assembly and the at least one data track.

9. A data storage drive in accordance with claim 8, wherein the optical pickup head comprises at least six adjacent photo receptors, wherein each of the at least six adjacent photo receptors sense optical input and provide an output signal in proportion to the optical input received.

10. A data storage drive for a data storage media having at least one data track thereon, the data storage drive comprising:
- (a) a media mover having a speed control input for receiving a speed setting, the media mover being for:
  - (i) removably mounting the data storage media thereto, and
  - (ii) for moving the data storage media in accordance with the speed setting;
- (b) a movable pickup head located proximal to the data storage media loaded on the media mover, the movable pickup head being for:
  - (i) reading and/or writing data to/from the at least one data track when the movable pickup head is substantially aligned with the at least one data track, and
  - (ii) detecting its relative position to the at least one data track and providing a tracking signal;
- (c) at least one actuator coupled the movable pickup, the at least one actuator having an input for receiving tracking information, and for locating the movable pickup head in accordance with the tracking information;
- (d) a vibration detector subsystem coupled to the movable pickup head, the vibration detector subsystem having an output for providing a pickup head displacement signal;
- (e) a controller coupled to the media mover, the movable pickup head, the at least one actuator, and the vibration detector subsystem, the controller for receiving the tracking signal and the pickup head displacement signal, and providing the speed setting and tracking information, and the controller for inactivating the at least one actuator and measuring the pickup head displacement signal;
- (f) a speed control subsystem coupled to receive the speed setting from the vibration detector subsystem, the speed control subsystem being for maintaining speed of relative movement between the removable data storage media and the pickup head assembly substantially at the speed setting; and wherein
- (g) the speed setting sets a resonant speed such that when the speed control subsystem is set to the resonant speed the pickup head assembly vibrates at its resonant frequency.

11. A data storage drive for a removable data storage media having at least one data track thereon, the data storage drive comprising:
- (a) at least one control subsystem coupled to a movable pickup head assembly;
- (b) a first actuator, a second actuator, and a speed controller;
- (c) the at least one control subsystem being for:
  - (i) detecting the at least one data track and for moving the pickup head assembly to maintain focus on the at least one data track,
  - (ii) moving the pickup head assembly to maintain tracking between the pickup head assembly and the at least one data track,
  - (iii) monitoring data transfer between the pickup head assembly and the at least one data track, and
  - (iv) adjusting relative speed of movement between the pickup head assembly and the movable storage media to maintain reliable data transfer between the pickup head assembly and the at least one data track;
- (d) at least another control subsystem coupled to the at least one control subsystem, the at least another control subsystem being for:
  - (i) disabling the tracking between the pickup head assembly and the at least one data track prior to detecting movement of the pickup head,
  - (ii) determining whether the movement of the pickup head is within at least one predetermined limit, and
  - (iii) changing relative speed of movement between the pickup head and the removable storage media to bring the movement of the pickup head within the at least one predetermined limit;

(e) a speed control subsystem coupled to receive the speed setting from the vibration detector subsystem, the speed control subsystem being for maintaining speed of relative movement between the removable data storage media and the pickup head assembly substantially at the speed setting; and wherein (f) the speed setting sets a resonant speed such that when the speed control subsystem is set to the resonant speed the pickup head assembly vibrates at its resonant frequency.

12. A method for detecting vibration in a read/write data storage drive for a removable data storage media, wherein the removable data storage media has at least one data track thereon, the method comprising the steps of:

a) initiating relative movement between a pickup head assembly, in the data storage drive, and the removable data storage media with tracking between the pickup head assembly and the at least one data track enabled;

b) setting the relative movement to resonant speed of the pickup head assembly;

c) when the relative movement is substantially at the resonant speed of the pickup head assembly, disabling the tracking:

d) measuring the displacement of the pickup head assembly with the tracking disabled to determine a vibration value; and e) comparing the vibration value with a vibration value limit and changing the relative movement from the resonant speed to another speed in accordance with the result of the comparison.

13. A method in accordance with claim 12, wherein a step prior to step (b) of determining the resonant speed of the pickup head assembly comprises the step of determining the resonant frequency of at least one actuator in the pickup head assembly.

14. A method in accordance with claim 13, further comprises the steps of determining frequency of an applied input to the at least one actuator at which physical vibration is substantially at a maximum.

15. A method in accordance with claim 12, wherein step (d) comprises the steps of detecting variations in output signals received from the pick up head assembly.

16. A method in accordance with claim 15, wherein the pickup head assembly comprises a plurality of optical sensor and at least one laser source, and wherein step (d) further comprises the steps of:

(i) directing the laser source at the at least one data track;

(ii) receiving tracking output signals from a first plurality of optical sensors indicating alignment of the pickup head assembly with the at least one data track; and (iii) receiving data signals from a second plurality of optical sensors indicating data on the as least one data track.

17. A method in accordance with claim 16, wherein step (d) further comprises the step of subtracting the tracking output signal from the data output signals in order to determine the vibration value.

* * * * *